United States Patent [19]
Henkes

[11] Patent Number: 4,765,718
[45] Date of Patent: Aug. 23, 1988

[54] COLLIMATED LIGHT SOURCE FOR LIQUID CRYSTAL DISPLAY UTILIZING INTERNALLY REFLECTING LIGHT PIPE COLLIMATOR WITH OFFSET ANGLE CORRECTION

[75] Inventor: John L. Henkes, Latham, N.Y.

[73] Assignee: General Electric Company, Wilmington, Mass.

[21] Appl. No.: 116,198

[22] Filed: Nov. 3, 1987

[51] Int. Cl.[4] .............................................. G02F 1/13
[52] U.S. Cl. ................................ 350/345; 350/331 R; 350/339 R
[58] Field of Search ................ 350/331 R, 339 R, 345

[56] References Cited

U.S. PATENT DOCUMENTS

| | | | |
|---|---|---|---|
| 4,299,447 | 11/1981 | Soltan et al. | 350/345 X |
| 4,330,813 | 5/1982 | Deutsch | 350/345 X |
| 4,487,481 | 12/1984 | Suzawa | 350/345 |
| 4,560,999 | 12/1985 | Tokuhara | 350/345 X |
| 4,704,004 | 11/1987 | Nosker | 350/339 R X |

FOREIGN PATENT DOCUMENTS 2157049A  10/1985  United Kingdom ................ 350/345

Primary Examiner—Stanley D. Miller
Assistant Examiner—Richard F. Gallivan
Attorney, Agent, or Firm—I. D. Blumenfeld

[57] ABSTRACT

A collimated light source for Liquid Crystal Display includes a light integrating sphere and an internally reflective light pipe means for producing a relatively collimated light beam for illuminating a liquid crystal display. Compensation for offset or skew angle of the collimated light near the edge of the light pipe is provided by a secondary collimator taking the form of crossed cylindrical lenses.

6 Claims, 4 Drawing Sheets

COLLIMATED LIGHT SOURCE FOR LIQUID CRYSTAL DISPLAY UTILIZING INTERNALLY REFLECTING LIGHT PIPE COLLIMATOR WITH OFFSET ANGLE CORRECTION

The invention relates to a light source for Liquid Crystal Panel Display which includes a collimated light source utilizing internally reflecting, tapered light pipes as a light collimator. A secondary correcting collimator is positioned between the end of the light pipes and the Liquid Crystal Display to correct offset angle of the light emitted near the edges of the tapered light pipe collimator.

BACKGROUND OF THE INVENTION

Flat Panel Liquid Displays, particularly of the type utilizing an X,Y matrix of individual pixels arranged in a row and column format are well-known and useful in a variety of applications. Liquid Crystal Displays of this matrix type are usually twisted nematic cells and incorporate polarizers located on each side of the Liquid Crystal Display Panel with a light source positioned behind the Panel. Due to the nature of the arrangement of molecules in a namatic Liquid Crystal Display, light from a particular off-axis direction is not equally effective as light from another off-axis direction. That is, because of the nature of liquid displays, the angle from which the display is viewed can often affect contrast ratio, especially if the light is uncollimated.

A recently filed application, entitled "Light Source from Liquid Crystal Display Panel Utilizing Internally Reflecting Light Pipes", Ser. No. 941,002, filed Dec. 12, 1986, U.S. Pat. No. 4,735,495, in the name of John L. Henkes the inventor of the instant application, and assigned to General Electric Company assignee of the instant invention, describes a source of relatively collimated light for a Liquid Crystal Display. The collimated light system in the above identified application involves the use of a light integrating sphere having tapered light pipe means coupled thereto for producing a relatively collimated light output for illuminating a Flat Panel Liquid Crystal Display. In the collimated light source described in the above identified application, the light is collimated within a permissilbe collimation deviation, ±r as for example, ±10 or 11 degrees from absolute collimation; with the degree of collimation, i.e., lthe maximum deviation from absolute collimation, depending on the design of the Flat Panel Liquid Crystal Display.

In a collimated light source of this type,i.e., using a tapered light pipe or light pipes, it has been found that in addition to the permitted collimation deviation there is also an offset or skew angle of the collimated light as a function of distance from the axis of the light pipe to the edge of the light pipe or pipes and collimated light with the permitted deviation from collimation of ±r is skewed or offset from an axis orthogonal to the surface of the light pipe thus offsetting the light from the axis. This offset of the collimated light is undesirable as it may, in turn, cause problems due to the unequal effects of the offset collimated light.

Applicant has found that offset of the collimated light beam towards the edge of the collimating light pipes may be corrected by means of a secondary collimator positioned between the end of the light pipe collimator and the Flat Panel Liquid Crytal Display with the secondary collimator taking the form of crossed cylindrical lenses which bend the light back to compensate for the offset or deviation angle.

It is therefore a principal objective of the invention to provide a collimated light source for a Flat Panel Liquid Crystal Display in which an offset or skew of the collimated light is corrected.

Another objective of the invention is to provide a collimated light source for a Liquid Crystal Display utilizing tapered light pipes and secondary collimators for compensating for offset of the collimated light from the tapered light pipes.

Yet another objective of the invnetion is to provide a collimated light source for a Flat Panel Liquid Crystal Display utilizing accommodation of light pipes, an integrating light source and a secondary collimation element for compensating for offset or skew in the angle of collimated light emitted from the light pipes.

Other objectives and advantages of the invention will become apparent as the description proceeds.

BRIEF SUMMARY OF THE INVENTION

The various advantages of the invention are realized in an arrangement in which a high intensity light source is positioned in a light integrating sphere. An opening in the sphere acts as the entrace pupil for a collimator the form of a tapered light pipe means or an array of tapered light pipes. Light exiting from the sphere is entirely reflected within light pipes so that collimated light, within a predetermined degree of deviation, is emitted at the other end of the pipe(s) to illuminate a Flat Panel Liquid Crystal Display. Any offset or skew of the collimated light near the edges of the tapered light pipes is corrected by interposing a secondary collimating source in the form of crossed cylindrical lenses between the light pipe(s) and the Liquid Crystal Display. The crossed cylindrical lenses bend the skewed light back to compensate for any offset in the collimated light along both axes.

The novel features which are characteristics of this invention are set forth with particularly in the appended claims.

The invention itself, however, together with further objectives and advantages thereof, may bext be understood by reference to the following description taken in connection with the accompanying drawings in which:

DETAILED DESCRIPTION OF THE INVENTION

Figure 1:
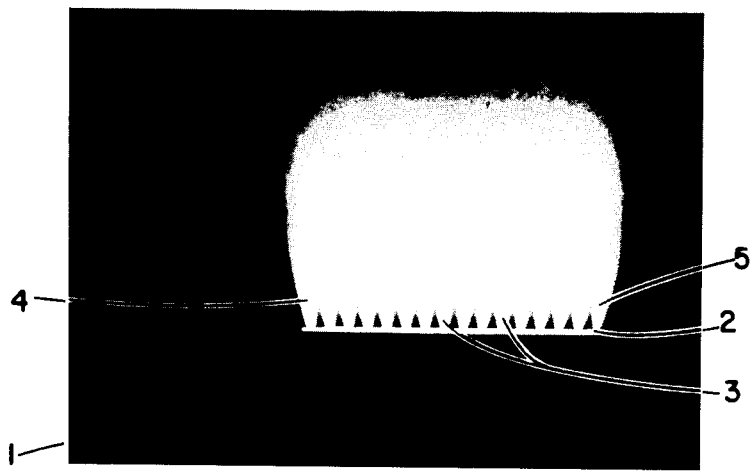
FIG. 1 is a photograph of a collimating source with a tapered light type showing the emitted light bundles and the offset of the light near the edges of the pipe.

FIG. 1 is a photograph illustrating the light emitted from the end of a tapered light pipe collimator of the type illustrated and described in the copending application referred to above. In order to illustrate the offset of skew of the collimated lioght near the edges of the tapered light pipe, a grid element was positioned in front of the emitting end of the tapered light pipe thus breaking up the light from pipe 1 into a plurality of light bundles. Thus, FIG. 1 shows a tapered light pipe having an emitting end 2. The perforated grid, not visible in the photograph, is positioned in front of the end of the light pipe and thus breaks up the light beam into a plurality of individual light bundles 3 extending outwardly from the center axis to the edge of the light pipe.

As will be seen easily by observation, light bundles 4 and 5 near the edges of the light pipe are offset outwardly relative to the light bundles towards the center or principal axis of the light pipe. That is, light bundles 6 at or near the axis of the pipe have a central or principal ray at the center of the bundle which is orthogonal to the surface of the light pipe. However, near the edge of the light pipe the light bundles 4 and offset or skewed; that is, the center ray of each light pipe bundle 4 and 5, unlike the bundles near the center are no longer orthogonal to the surface but is offset by some angle W. As a result of this offset of the light the light distribution is spread and represents light that extends beyond the active area of the Display and is therefore wasted light. Offset of the light from the orthogonal axis of the light pipe can affect the visual aspects of the Flat Panel Liquid Crystal Display and results in a deleterious effect on contrast ratio of the display.

Figure 2:
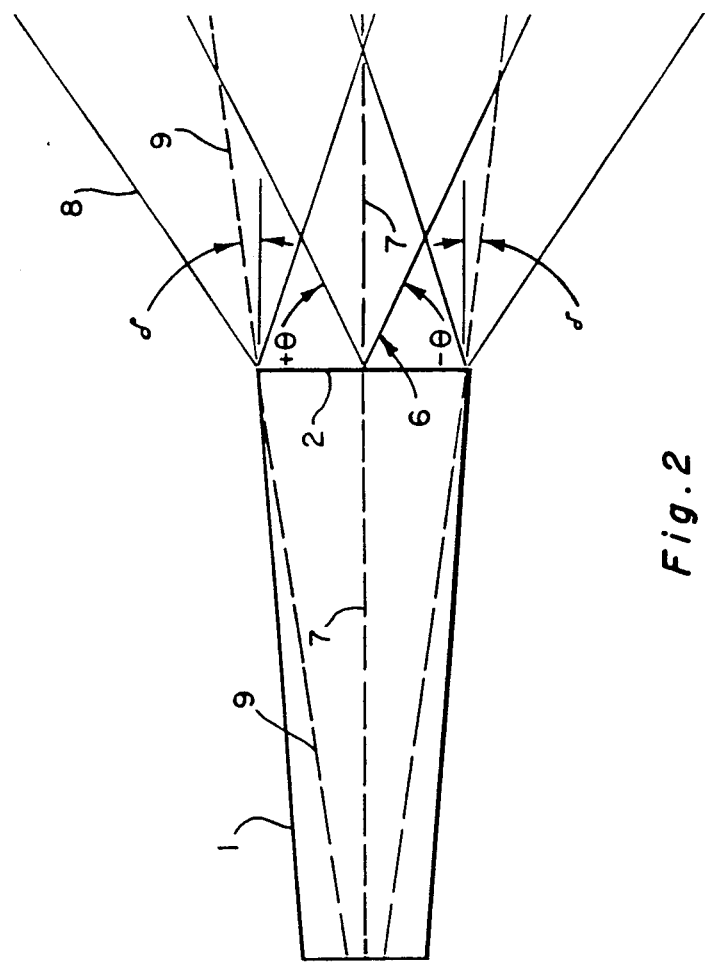
FIG. 2 is a schematic view of the collimated light output from the light pipes illustrating the collimated light and the offset skew of the collimated light emitted from the light pipes.

In FIG. 2 of the light rays and light bundles emitted from tapered light pipe 1 show that Light Bundle 6 at the center axis of the light pipe 1 has a principal ray. The deviation from absolute collimation of light bundle 6 is $\pm r$ degrees. It can be seen that light bundle 8 has a central or principal ray 9 which is no longer orthogonal to the surface of the light pipe but is offset from orthogonal bn an angle W so that the light rays not only have a deviation of $\pm r$ from pure collimation are also offset from the orthogonal by a skew angle W.

Figure 3:
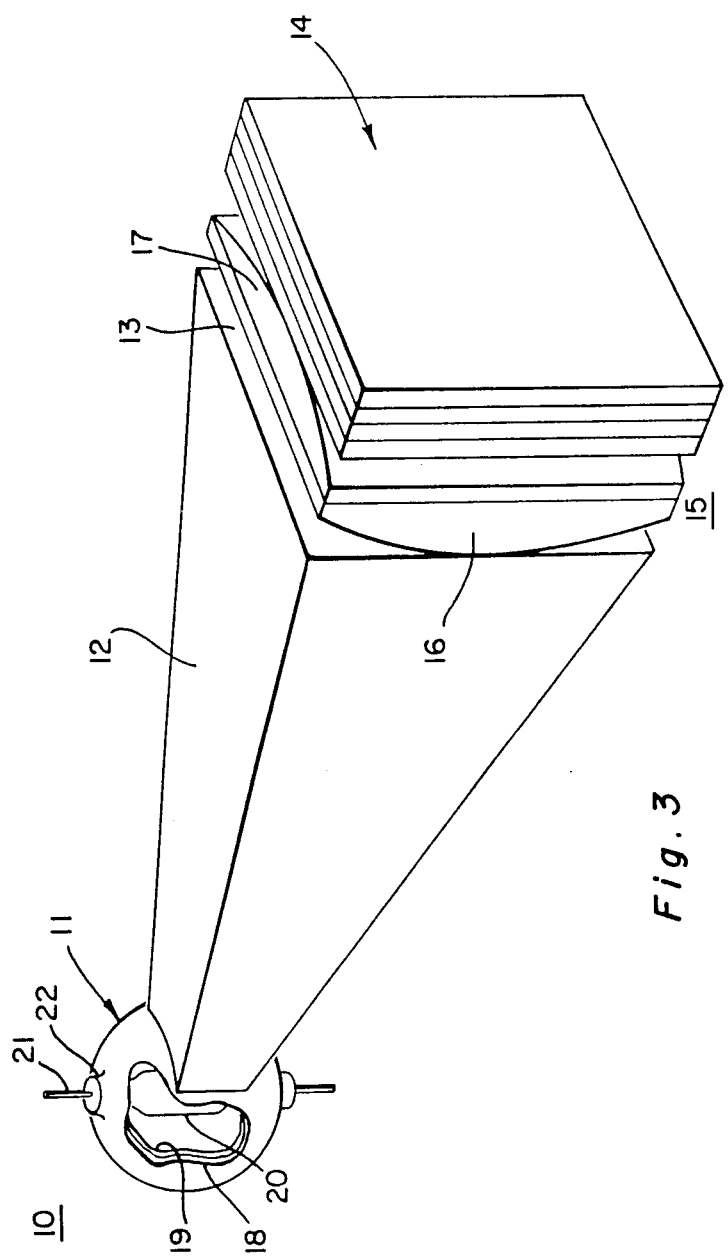
FIG. 3 is a perspective view of an assembly utilizing a secondary collimator in the form of cross cylindrical lenses between the end of collimating light pipes and the Flat Panel Liquid Crystal Displays.

FIG. 3 illustrates a collimated light source for a Liquid Crystal Display Panel of the type incorporating a tapered internally reflecting light pipe collimator in combination with a secondary collimator to compensate for offset or skew of the emitted light away from the axis of the light pipe. The collimated illuminating system includes a light source 10 which comprises light integrating sphere 11 shown partially broken away, and a tapered light pipe means 12 the narrow end of which receives light from the sphere. The light pipe means has an emitting surface 13 for illuminating a Liquid Crystal Display 14. Positioned between the emitting surface 13 and the display is a secondary collimator 15 consisting of a pair of crossed cylindrical lenses 16 and 17. The focal points of each of these lenses which establishes their curvature is determined by the intersection point of all of the principal light rays emitted from the surface 13 of the light pipe in the horizontal and vertical direction respectively.

As may be noted the tapered light pipe collimator 12 is tapered both in the horizontal and vertical direction thus collimating the emitted light along orthogonal axes. The light pipe means illustrated in FIG. 3 is a single light pipe in the horizontal and vertical planes and the secondary collimator takes the form of crossed cylindrical lenses which bend the light near the edge of the exit apertures to compensate for the offset or skew angle in both planes. In the event the light is collimated along one axis (vertical or horizontal) only; i.e., the light pipe is only tapered along one axis; then the secondary collimator takes the form of a single cylindrical lens which bends the light in only one plane to compensate for the offset or skew angle near the edges of the exit aperture of the pipe.

The light pipe means of FIG. 3 is also shown in single light pipe with an exit aperture sized to equal the active area of the liquid crystal display which is illuminated by the collimated light. The invention is by no means so limited. The light pipe means may take the form of a plurality of light pipes having their narrow ends adjacent to openings in the integrating light sphere and their exit apertures positioned adjacent to each to form, in effect, a single exit aperture. If multiple light pipes are employed which are tapered along two axes to collimate the light in both planes, then separate secondary collimating lenses or lens pairs would be necessary for each light. However, if skew angle correction is only required along one axis then a single cylindrical lens is adequate.

Light integrating sphere 11 consists of an outer metallic spherical shell 18 lined with a light reflecting layer 19. Light reflecting layer 19 may, for example, by a layer of barium sulfate with a reflectivity of 99.8%. Barium sulfate layers of this type are commercially available and may for example be obyained from the Eastman Kodak Company, of Rochester, N.Y. under trade designation Kodak 6030. Positioned in the integrating sphere is a high intensity discharge lamp 20. The lamp outlet leads 21 are brought out of the sphere through suitable glass standoff insulators 22. Light integrating sphere 11 has an opening to which the narrow end of light pipe means 12 is secured. The opening may consist of a single opening or of a plurality of openings. That is, although FIG. 3 shows the light pipe means 12 as a unitary element, the light pipe means 12 may also consist of a plurality of individual parallel tapered light pipes which are secured to the integrating sphere. The opening(s) in the integrating sphere is thus the entrance pupil of the narrow end of internally reflecting light pipe collimator 12 with the wide or emitting end 13 of the light pipe positioned closest to the Display and secondary collimating element 15. Light from the high density discharge lamp 20 is multiply reflected from the interior reflecting layer 19 of the sphere. Direct or reflected light rays which impinge on the opening of the light sphere are internally reflected within the light pipe means 12 and are emitted as substantially collimated light from the wide end of the light pipe to illuminate Liquid Crystal Display Cell 14.

The width and heigth of emitting surface 13 is determined by the width and height of the active area of the display and the number of the light pipes to be utilized. Thus, for example, for a Flat Panel Display having a 4×4 inch active area the overall emitting surface area 13 of the light pipe means must essentially be 4 inches by 4 inches.

The dimensions of the narrow end of the light pipe or of each light pipe (once the width of the emitting surface and the taper is known), is determined by the maximum permitted deviation, from absolute collimation as defined by the designer of the Liquid Crystal Display. Thus, for example, if the Liquid Display designer limits the deviation to $\pm 11.5$ degrees (i.e., 23° total), the width of the narrow end and hence the ratio of light pipe exit and entrance widths is determined in the following manner;

The critical light ray; i.e., the one deviating by 11.5° from a line orghogonal to one edge of the wide of the light pipe end is drawn through that edge and through the tapered light pipe. The critical light ray at the center of the exit aperture for any given degree of collimation (i.e. ±r) is also drawn through the tapered light pipe. The point of convergence of the tapered light pipe (for any given taper which produces the total internal reflection) becomes the center of a circle is made tangent to the critical light rays of the center and at the edge of the exit aperture thereby also determining the correction required from the lenses. The point of convergence of the sides of the tapered light pipe, for a given taper, becomes the center of a circle which is made tangent to the critical light ray. The points at which that circle corsses the tapered edges of the light pipe is the point at which the light pipe is cut off to form the narrow end of the pipe. This then determines the ratio of the wide and narrow ends of the light pipe and hence, (depending on the width and the angle of taper) the length of the light pipe from its narrow to its wide end.

Figure 4:
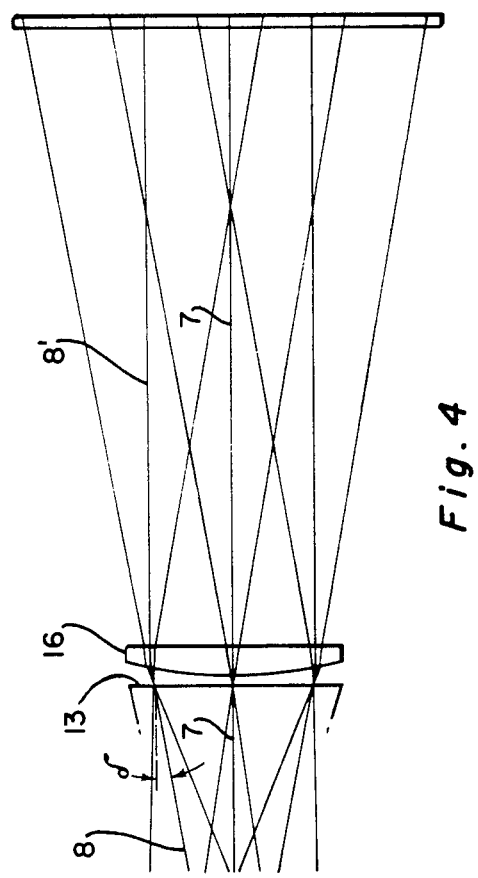
FIG. 4 is a light ray diagram showing the effects of the secondary collimator.

The Liquid Crystal Flat Panel Display 14, typically consists of two transparent glass plates separated by a sealant around its edges to define a cavity in which a twisted nematic liquid crystal is retained. The interior surface of one of the transparent plates has conductive, light transparent pixel electrodes (typically of indium tin oxide ITO) deposited thereon in rows and columns to define an X-Y matrix, the other a continuous conductive light transparent ITO layer. The Liquid Crystal Display may be energized to display a variety of signs, symbols and depictions by selectively applying voltages to the pixels. FIG. 4 illustrates the effect of one of the cylindrical collimator lenses in modifying the principal light rays at the edge of the light point so as to bend the ray until it's parallel to the principal rays of the light emitted near the axis of the tapered light pipe. Thus, in FIG. 4 the principal ray 8 emitted from at the edge of light pipe is offset by the angle W from the principal ray 7 and the light bundle at the center axis of the light pipe. Light ray 8 in passing through collimating cylindrical lens 16 is bent by an amount equal to the offset angle W so that the principal ray emitted from cylindrical lens surface is now parallel to light ray 7 of the light bundle emitted from light pipe at the principal axis. As a result, any offset or skew of the light which is emitted from light pipe surface 14 away from its center is compensated for so as to illuminate the central portion of the Liquid Crystal Display evenly.

While FIG. 4 illustrates an arrangement in which secondary collimating element bends the light by an angle equal to the offset or skew angle W, the invention is not limited thereto. If desired, the compensation provided by the cylindrical secondary collimating lens may exceed W so that the light is bent inwards and the overall distribution of the light illuminating the Liquid Crystal Display is reduced both in the horizontal and vertical dimension. The instant invention described in connection with certain preferred embodiments thereof, the invention is by no means limited thereto since other modifications of the instrumentation employed may be made but still fall within the scope of the invention, and it is intended in the appended claims to cover all such modifications that fall within the true spirit and scope of the invention.

What is claimed as new and to be desired to be secured by Letters Patent is:

1. A high contrast liquid crystal display system including:
    (a) a liquid crystal display element,
    (b) a collimated light source positioned to illuminate one side of said display comprising:
        (1) a light integrating sphere containing a source of uncollimated light and having an opening to permit a portion of the uncollimated light to exit from the sphere;
        (2) elongated tapered light pipe means, one end of said light pipe means positioned adjacent the opening in said sphere and the other end being positioned adjacent to said display whereby light exiting from said sphere is internally reflected in said pipe means to illuminate said display with a collimated light beam,
    (c) secondary light collimating means between said light pipe means and said display to compensate for the offset angle from normal of the light emitted from the end of said light pipe means.

2. The liquid crystal display system according to claim 1 wherein said secondary collimating means comprises cylindrical lens means for bending light emitted from the end of said light pipe means to compensate for the offset angle.

3. The liquid crystal display according to claim 2 wherein the focal length of said cylindrical lens means causes the light to bend in a direction and by an amount equal to the offset angle.

4. The liquid crystal display according to claim 3 wherein said light pipe means is tapered in the horizontal and vertical planes and said secondary collimator comprises crossed cylindrical lenses to compensate for offset angle in both planes.

5. The liquid crystal display according to claim 3 wherein said light pipe means comprised a plurality of tapered light pipes.

6. The liquid crystal display according to claim 5 wherein said light pipes are tapered in the horizontal and vertical planes and said secondary collimator comprises crossed cylindrical lenses to compensate for offset angle in both planes.

* * * * *